United States Patent
Lem et al.

(10) Patent No.: US 10,507,159 B2
(45) Date of Patent: Dec. 17, 2019

(54) CUSTOM MASSAGE PROGRAMMING USING TOUCHSCREEN INTERFACE

(71) Applicant: Ford Global Technologies, LLC, Dearborn, MI (US)

(72) Inventors: Jeroen Lem, Maastricht (NL); Amber LaVerne Hall, Oak Park, MI (US); Brian Boland, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 601 days.

(21) Appl. No.: 15/297,701

(22) Filed: Oct. 19, 2016

(65) Prior Publication Data

US 2018/0104135 A1    Apr. 19, 2018

(51) Int. Cl.
  *A61H 9/00* (2006.01)
  *G06F 3/0482* (2013.01)
  *G06F 3/0488* (2013.01)

(52) U.S. Cl.
  CPC ......... *A61H 9/0078* (2013.01); *G06F 3/0482* (2013.01); *G06F 3/04883* (2013.01)

(58) Field of Classification Search
  CPC ....... A61H 9/0078; B60N 2/665; B60N 2/976
  See application file for complete search history.

(56) References Cited

U.S. PATENT DOCUMENTS

| | | | |
|---|---|---|---|
| 8,616,654 B2 | 12/2013 | Zenk et al. | |
| 2006/0049678 A1* | 3/2006 | Kern | A47C 7/467 297/284.3 |
| 2010/0031449 A1 | 2/2010 | Cheng | |
| 2011/0055720 A1 | 3/2011 | Potter et al. | |
| 2011/0077561 A1* | 3/2011 | Choly | G06F 3/04883 601/15 |
| 2012/0032478 A1* | 2/2012 | Friderich | B60N 2/5685 297/180.1 |
| 2012/0086249 A1 | 4/2012 | Hotary et al. | |
| 2015/0169124 A1* | 6/2015 | Le | G06F 3/0412 345/173 |
| 2015/0277754 A1* | 10/2015 | Misch | G06F 3/04842 715/769 |
| 2016/0059750 A1* | 3/2016 | Lem | A61H 9/0078 601/149 |
| 2018/0055230 A1* | 3/2018 | Cheng | A47C 7/02 |

\* cited by examiner

*Primary Examiner* — LaToya M Louis
(74) *Attorney, Agent, or Firm* — Vichit Chea; Price Heneveld LLP (57) ABSTRACT

A massage system includes a seat having a first surface, a first massage assembly beneath the first surface and including a first matrix of inflatable bladders, and an interface including a touchscreen. The system further includes a controller displaying an image of the matrix on the touchscreen, receiving a touch input from the touchscreen, interpreting the touch input as an indication of a desired massage sequence, and causing the first massage assembly to implement the desired massage sequence.

14 Claims, 7 Drawing Sheets

CUSTOM MASSAGE PROGRAMMING USING TOUCHSCREEN INTERFACE

FIELD OF THE INVENTION

The present invention generally relates to programming or assembling a custom massage routine. In particular, the massage routine can be assembled using a matrix image presented on a touchscreen that generally matches a massage bladder matrix within a vehicle seat.

BACKGROUND OF THE INVENTION

Various types of vehicle seats have been developed that use integrated pneumatic bladders to implement massage functionality. Such seats most often use large bladders that are primarily designed for seat adjustment to implement a form of massage via a series of present adjustments. Some seats have more recently been developed that use smaller bladders for a dedicated massage that acts over a smaller area. Massage sequences can be implemented by inflating and deflating such smaller bladders in a predetermined sequence.

The incorporation of smaller bladders, however, has resulted in the possibility of greater variation in the particular shape or effect of the massage that the seat is capable of implementing. Accordingly, an interface may be desired to allow a user to easily assemble or program a custom massage that takes advantage of such capability.

SUMMARY OF THE INVENTION

According to one aspect of the present disclosure, a massage system includes a seat having a first surface, a first massage assembly beneath the first surface and including a first matrix of inflatable bladders, and an interface including a touchscreen. The system further includes a controller displaying an image of the matrix on the touchscreen, receiving a touch input from the touchscreen, interpreting the touch input as an indication of a desired massage sequence, and causing the first massage assembly to implement the desired massage sequence.

According to another aspect of the present disclosure, a vehicle includes a seat having a first surface and a first massage assembly that is positioned beneath the first surface and includes a first matrix of inflatable bladders. The vehicle further includes an interface having a touchscreen and a massage controller displaying an image of the matrix on the touchscreen, receiving a touch input from the touchscreen, interpreting the touch input as an indication of a desired massage sequence, and causing the first massage assembly to implement the desired massage sequence.

According to another aspect of the present disclosure, a method for implementing an automated massage includes displaying an image of a matrix on a touchscreen, receiving a touch input from the touchscreen, interpreting the touch input as an indication of a desired massage sequence, and causing a first massage assembly including a first matrix of inflatable bladders that corresponds to the matrix image to implement the desired massage sequence by selective inflation and deflation of ones of the bladders.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
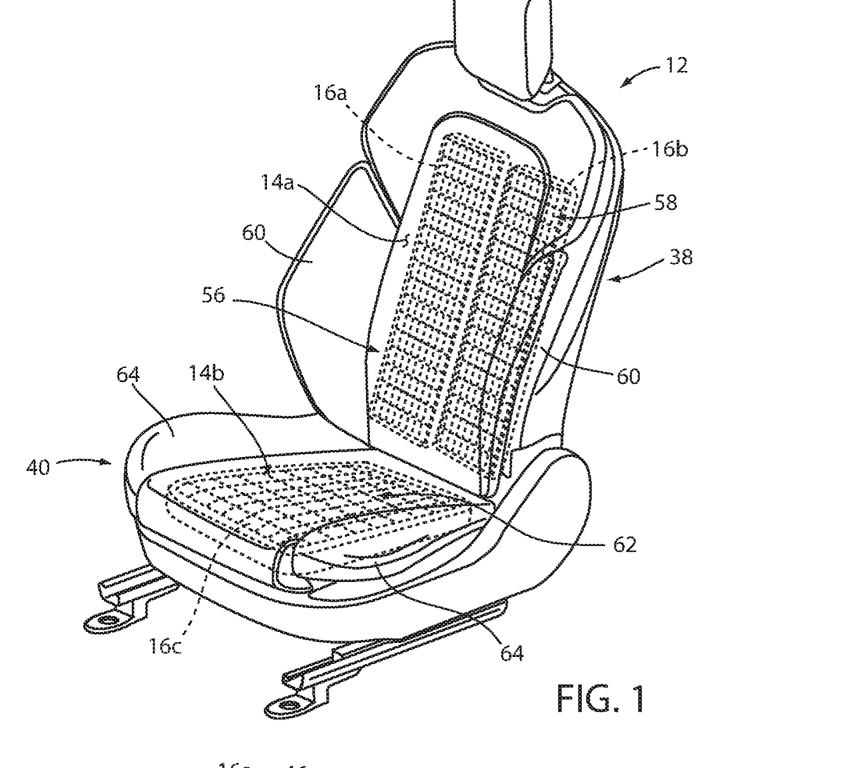
FIG. 1 is a front perspective view of a vehicle seat showing the incorporation of various massage assemblies therein.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 1B:
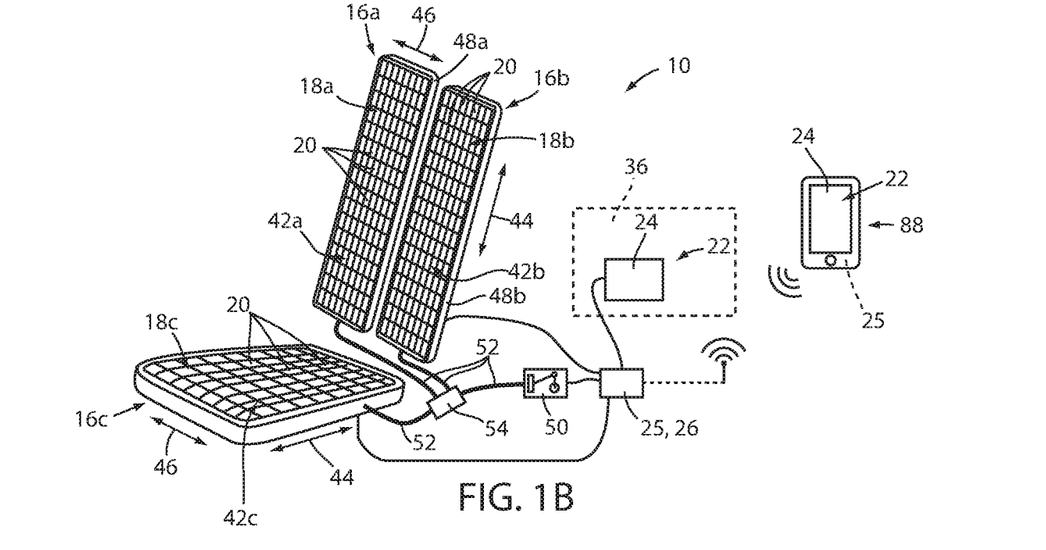
FIG. 1B is a front perspective view of the massage assemblies of FIG. 1 shown schematically with additional components of a massage system.
Figure 3:
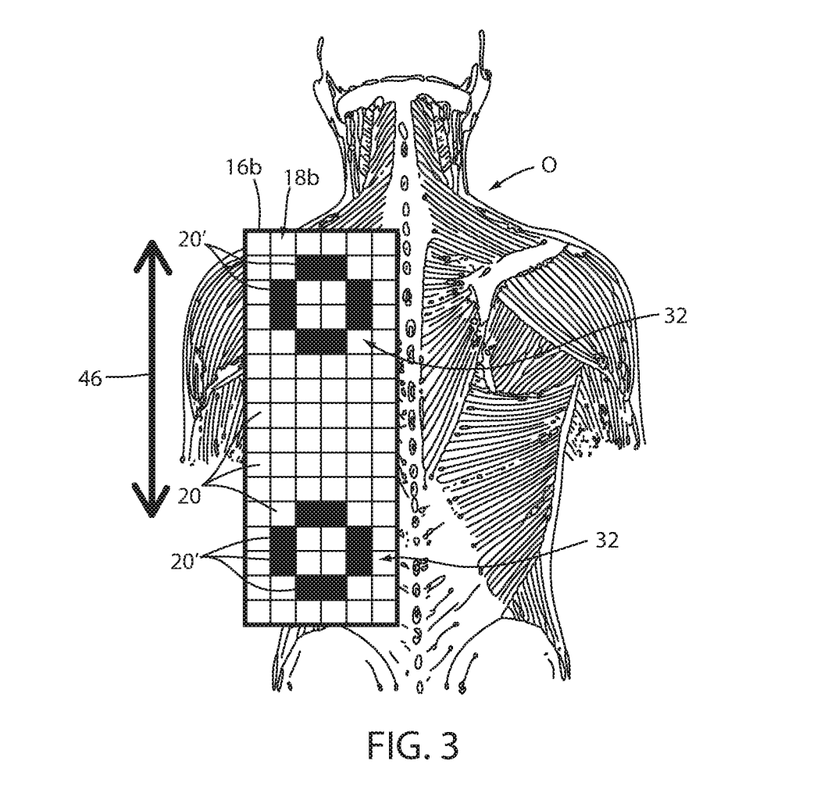
FIG. 3 is a schematic diagram of a massage sequence that can be implemented using one of the massage assemblies of FIG. 1B with respect to the back of an occupant.

Referring to FIGS. 1-1B, reference numeral 10 generally designates a massage system. Massage system 10 includes a seat 12 having a first surface 14a or 14b, a first massage assembly 16a, 16b, or 16c beneath the first surface 14 and including a first matrix 18 of inflatable bladders 20. It is noted that when the massage assemblies are referred to collectively or generically, they may be referred to simply as massage assemblies 16; however, when a specific massage assembly is discussed, it may be referred to as one of massage assemblies 16a, 16b, or 16c, with other similarly numbered components being referred to in a similar manner. System 10 further includes an interface 22 including a touchscreen 24 (which, as shown in FIG. 1B can be included in a vehicle human-machine interface ("HMI") 36 or in a smartphone 88 in communication with controller 26) displaying an image 28 (FIG. 4) of the first matrix 18 on the touchscreen 24 and receiving a touch input (which may be a moving touch 70 or a tap or release 82). A processor 25 interprets the touch input as an indication of a desired massage sequence 32 (FIG. 3). A controller 26 causes the first massage assembly 16 to implement the desired massage sequence 32.

Figure 2:
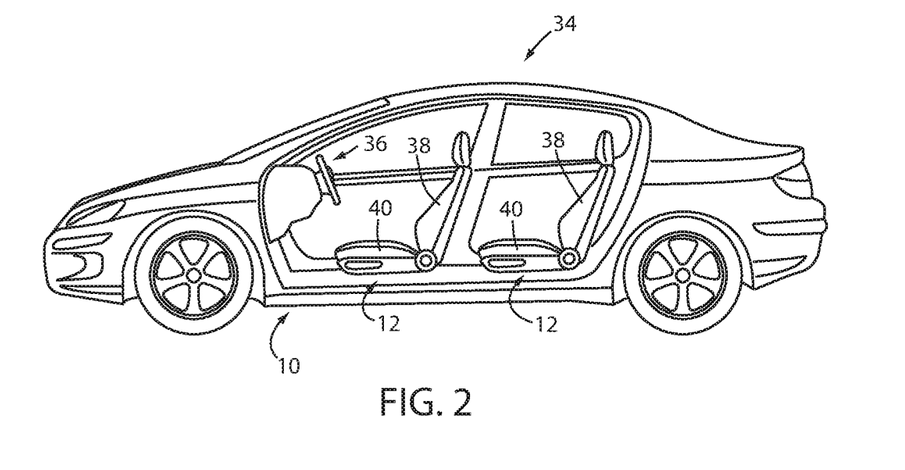
FIG. 2 is a side elevation view of a vehicle incorporating the seat and massage system of FIGS. 1A and 1B.

With additional reference to FIG. 2, system 10 is shown in place within an embodiment of seat 12 that is a vehicle seat, specifically configured for use within vehicle 34. Further, touchscreen 24 can be included within, or otherwise dictated by functionality of, a human-machine interface HMI 36 within an interior of vehicle 34. In an embodiment, the touchscreen 24 can be included within a human-machine interface 36 that is positioned adjacent to the particular seat 12 with which system 10 is associated. In the example shown in FIG. 2, seat 12 may be a front vehicle seat such that touchscreen 24 can be included within an HMI 36 positioned on the front instrument panel of vehicle 34, although other locations are possible. In such an embodiment, the massage functionality can be accessed through a menu of various other functions associated with vehicle 34 available for monitoring and/or control by HMI 36. As shown in FIG. 1B, the processor 25 and controller 28 may be directly coupled with one another, including by being within a single unit associated with seat 12 and present within vehicle 34.

Additionally or alternatively, the processor 25 of system 10 can be considered to be the processor 25 within smartphone 88 when smartphone 88 is used as the interface 22. In such a manner, the processor 25 within smartphone 88 can interpret the touch input 70 or 82 as the desired massage sequence 32 for assembly and transmission to controller 26 for implementation. Such transmission can be made by various communication means including by a controller area network ("CAN"), or using WiFi, Bluetooth® or the like. The input interpretation and massage assembly functionality can be achieved by, for example, a specifically-programmed application stored in memory of smartphone 88 and executable by the processor 26 thereof. The receipt and execution of the sequence 32 assembled by smartphone 88 can be confirmed using the input 22 within vehicle HMI 36, for example.

In the illustrated embodiment, as well as in other variations or implementations of system 10, at least one of various massage assemblies 16a included within system 10 can be positioned within a seatback 38 associated with seat 12 such that the massage assemblies 16a and/or 16b positioned therein can contact respective locations of a back of an occupant O, as depicted schematically in FIG. 3. As shown in FIG. 1, additional massage units 16c can be positioned within an adjacent cushion 40 with which seatback 38 is coupled.

System 10 of the type generally described herein, and as shown in FIGS. 1-3, can generally implement massage functionality within seat 12 by selective inflation and deflation of respective ones of the bladders 20 included in the various massage matrices 18. More specifically, each individual massage assembly 16 can have associated therewith a respective bladder matrix 18 including an array 42 of bladders 20, each of such bladders 20 being individually inflatable and deflatable, extending in a first direction 44 and a second direction 46. The individual bladders 20 can be sized and positioned to be close enough together so that sequential inflation and deflation of bladders 20 in one of directions 44 and 46 can simulate the movement of a single object beneath surface 14. In this manner, a group of adjacent ones of bladders 20 can similarly be inflated together, with subsequent inflation of adjacent ones of bladders 20 and deflation of opposite ones of bladders 20 simulating movement of a larger object beneath surface 14 in one of directions 44 and 46, or both directions 44 and 46.

As shown, a number of bladders 20 can be included in matrix 18 so as to extend over an area of the seat 12. In an embodiment, at least four bladders 20 can extend in first direction 44 and at least 8 bladders 20 can extend in second direction 46, although other arrangements are contemplated. Further, bladder matrix 18 can be of a generally air-impermeable, flexible polymer including by coupling (including by fusing, adhering, or otherwise) a pair of overlying membranes of such material. In this manner, a plurality of seams within matrix 18 can separate the individual inflatable bladders 20 from one another.

Massage assemblies 16 can further include a respective manifold unit 48 supporting and in communication with matrix 18. In particular, manifold units 48 can receive air from a pump 50 through respective supply lines 52 in further combination with a supply manifold 54 as needed. Manifold units 48 can direct the air received from pump 50 into individual ones of inflatable bladders 20 and can further control deflation of bladders 20 either by venting the air therein to the ambient environment or by drawing air back into manifold unit 48 itself. This air distribution can be achieved through either a number of capillaries branching off of supply line 52 or by providing an open fluid reservoir therein individually connected with ones of inflatable bladders 20 via respective valves. In this manner, both the manifold units 48 and pump 50 can be communicatively coupled with controller 26 for causing the pump 50 to pressurize system 10, as well as for causing manifold unit 48 to cause the above-referenced selective inflation and deflation of bladders 20 according to a desired massage sequence, such as the massage sequences 32 depicted in FIGS. 4-11 and discussed further below.

Figure 4:
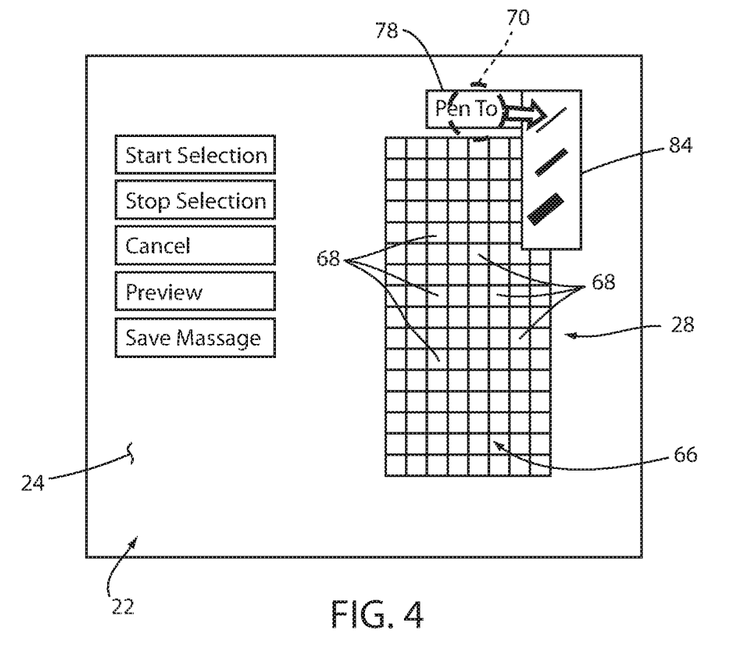
FIGS. 4-6 show a user interface during various stages of assembling a massage to be implemented on one or more massage assemblies according to one embodiment.
Figure 5:
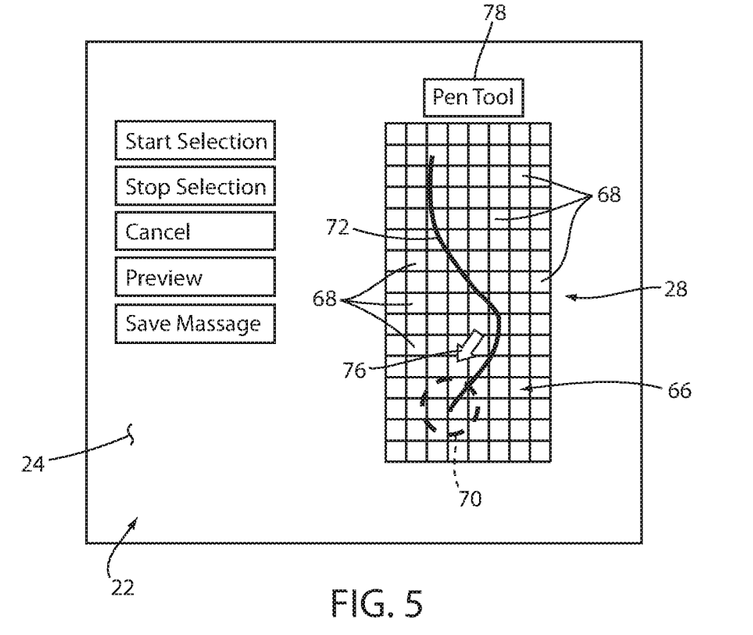
Figure 6:
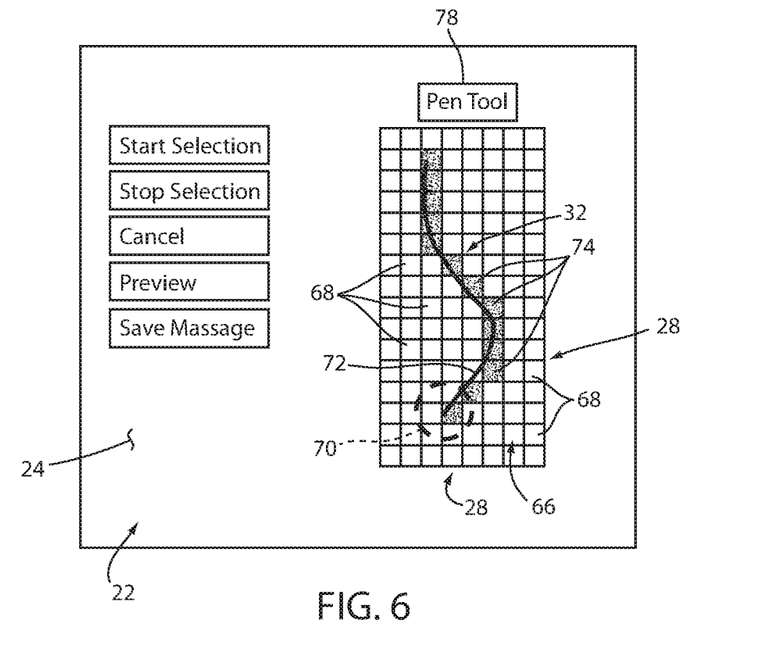

Turning now to FIGS. 4-6, and with continued reference to FIGS. 1-3, one process by which a user can customize a massage sequence 32 to be implemented by system 10 using massage assemblies 16 by way of interface 22 is shown. Such a process is generally described herein as using touchscreen 24 in a "pen mode" in which a user can draw the desired massage sequence 32 on the image 28 of matrix 18 on touchscreen 24, directly. As shown in FIG. 4, the user can begin by using a touch input to select the pen tool itself and, optionally, to select a desired thickness of the pen tool. Such thickness may, in one example, generally correspond to a number of bladders 20 included in a width (i.e. generally perpendicular to a direction of the drawn in massage sequence 32 (FIG. 6), as discussed further below). As shown in FIG. 5, the user can then use a particular input in the form of a continuous moving touch 70 over the image 28 of matrix 18 on touchscreen 24. Such an input 70 can be indicative of a line 72 along which the user would like the massage sequence 32 implemented. Accordingly, as shown in FIG. 6, processor 25 can interpret the location, shape, and direction of the line 72 as the desired massage sequence 32 by selecting the ones of the pixels or grid spaces as bladders 20 to include within the massage sequence 32, including ones of the inflatable bladders 20 with indication images 74 contacted or intersected by line 72.

As discussed above, the selected width of the pen tool can be used by processor 25 to determine a number of bladders 20 used to define a width of the desired massage sequence 32, defined as in a direction normal to line 72. In one example, the pen tool may be given a "thin" setting in which a single one of bladders 20 is used to implement the massage sequence 32 by processor 25 selecting one such bladder 20 as best fit along line 72 for each respective position along the length thereof. In a further example, a "medium" line can be used in which two adjacent bladders 20 are fit into sequence 32 along the length of line 72. Similarly, a "wide" pen can be used and interpreted by processor 25 as the desired massage sequence 32 by using three adjacent bladders 20 extending alone line 72. As further shown, processor 25 can cause the image 28 displayed on touchscreen 24 to indicate the ones of bladders 20 included in the massage sequence 32, for example, by changing the color of the selected ones of bladder images 68 included in matrix image 28 that form the massage sequence 32. As further indicated, the direction 76 of the moving touch input 70 can be interpreted as a direction for massage sequence 32 and can be used to assign or otherwise match an order in which the selected ones of bladders 20 (i.e. corresponding to the indication images 74) are inflated and deflated. In a further embodiment, interface 22 can allow the user to select the speed at which massage sequence 32 is executed, either by interpreting the speed with which line 72 is drawn as correlating with the desired massage speed or by providing an additional input on touchscreen 24 to adjust upward and downward the speed at which massage sequence 32 is executed.

Figure 7:
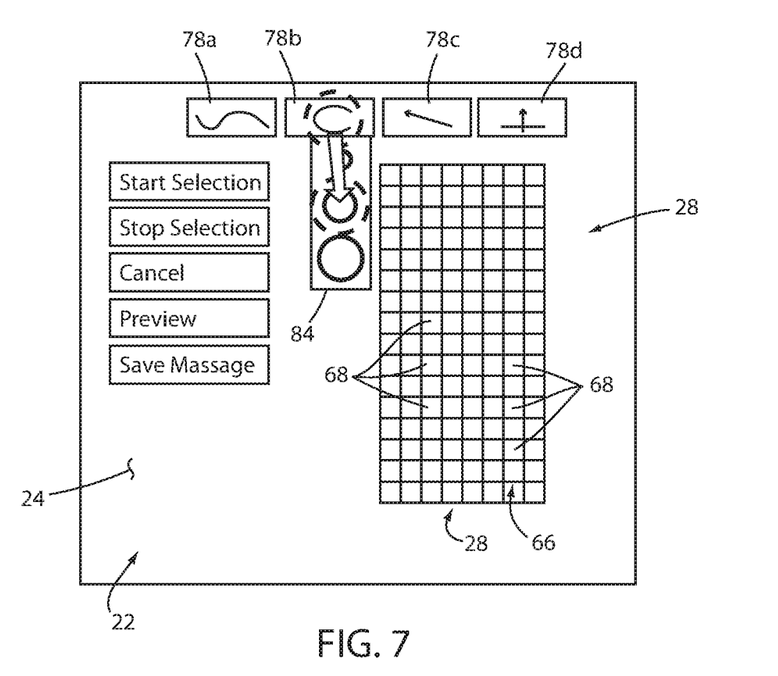
FIGS. 7-11 show the user interface during various stages of assembling a massage to be implemented on one or more massage assemblies according to another embodiment.

Turning now to FIGS. 7-9, and again, with continued reference to FIGS. 1-3, an additional process by which a user can enter a massage sequence 32 is described. Such a process can be selectively implemented in the same processor 25 and controller 26 within system 10 as the pen tool input described in FIGS. 4-6. Alternatively, processor 25 and/or controller 26 can implement the herein described process as an alternative to that which is discussed above in FIGS. 4-6. In particular, the process shown beginning with FIG. 7 illustrates a method by which a user can place various preselected massage elements 80 into various locations along the matrix image 28 for execution in corresponding areas within seat 12 by massage assemblies 16. As shown in FIG. 7, a number of selection blocks 78a,78b,78c, and 78d can be included in the image presented on touchscreen 24 adjacent the matrix image 28. These various blocks 78 can correspond with various massage shapes that controller 26 can implement using massage assemblies 16. For example, block 78a can correspond with a rolling massage in which a predetermined length or width of inflatable bladders 20 can be actuated in a rolling manner in either first direction 44, second direction 46 or a diagonal direction in a rolling or pulsing action, wherein as the sequential bladders 20 are inflated and deflated such inflation is done to varying degrees in increasing or decreasing fashion. In a similar manner, selection block 78b can represent a circular massage sequence, wherein certain ones of bladders 20 are inflated and deflated in a circular, or approximately circular motion. Selection block 78c can represent a straight line, of varying widths in a manner similar to that which is described above, in a preset or user-selectable direction. Still further, selection block 78d can represent a combination massage, in which a particular row of bladders 20, such as in second direction 46 are successively inflated and deflated in an outward manner in succession, in a row-by-row manner over a predetermined distance and first direction 44, which may simulate a stretching massage or the like.

Figure 8:
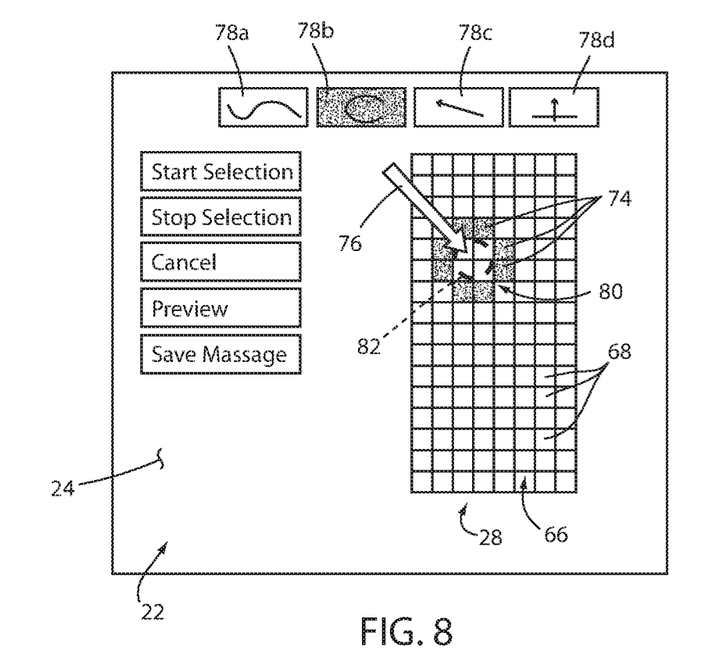

As shown in FIGS. 7 and 8, the user can place the desired ones of preselected elements 80 by either tapping on the desired selection block 78a-78d and then further tapping on the desired area within image 28 for implementation of the desired preselected element 80, or by tapping and holding on the desired selection block 78a-8d and dragging onto the desired area of image 28 before releasing the drag in the desired area of image 28, at which point processor 25 causes a representation of the preselected element 80 to be displayed on matrix image 28 by changing the representation of the included bladders 74.

As further shown in FIG. 8, interface 22 can allow the user to select or change the size of an element 80 to be placed on image 28 for implementation using massage assemblies 16. As shown, when the user taps or holds on a desired one of the selection blocks 78a-78d, an adjustment block 84 can be presented adjacent thereto. In the example shown, selection block 78b corresponding to a circular massage element can have associated therewith an adjustment block 84 presenting three different sizes of circular massage to be added to the desired massage sequence 32 (FIG. 3). In one example a smaller circular massage can include four adjacent massage bladders 20 (FIG. 1B), while larger circular massage elements can expand outwardly therefrom. As shown in FIGS. 7 and 8, a medium circular massage can be selected and placed in the area of a tap or release 82 within image 28, as indicated by images 74, which represent single bladders 20 to be inflated and deflated in sequence in a circular direction (clockwise or counterclockwise) inscribing four adjacent bladders. In an example, a further adjustment block 84 can be added that can allow a user to select upon various sizes in specific directions (i.e. clockwise or counterclockwise).

Figure 9:
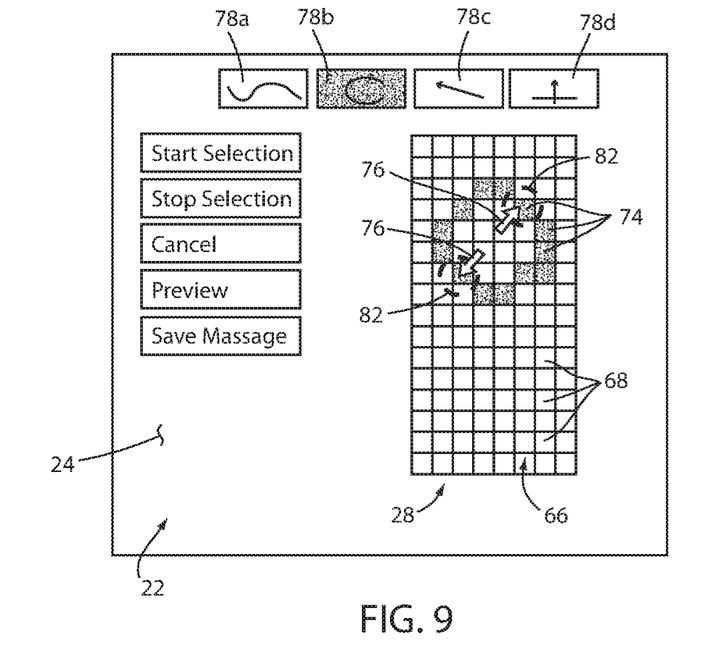
Figure 10:
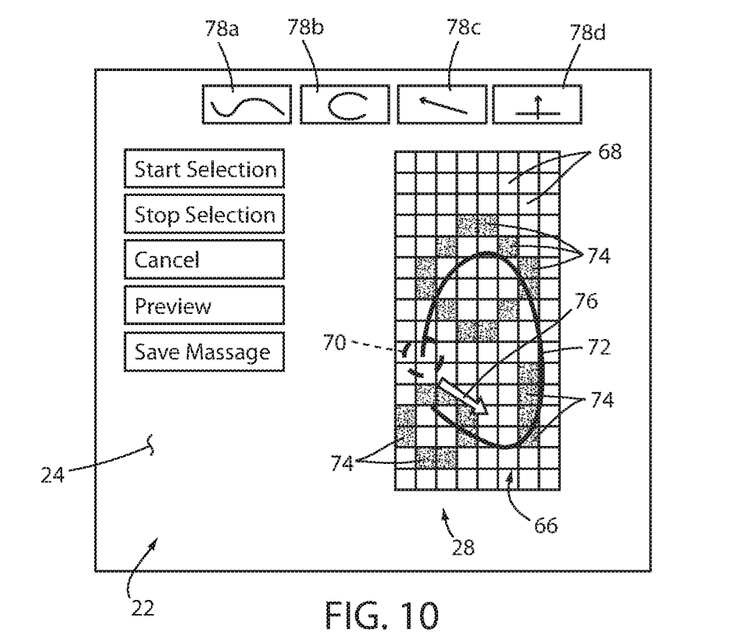
Figure 11:
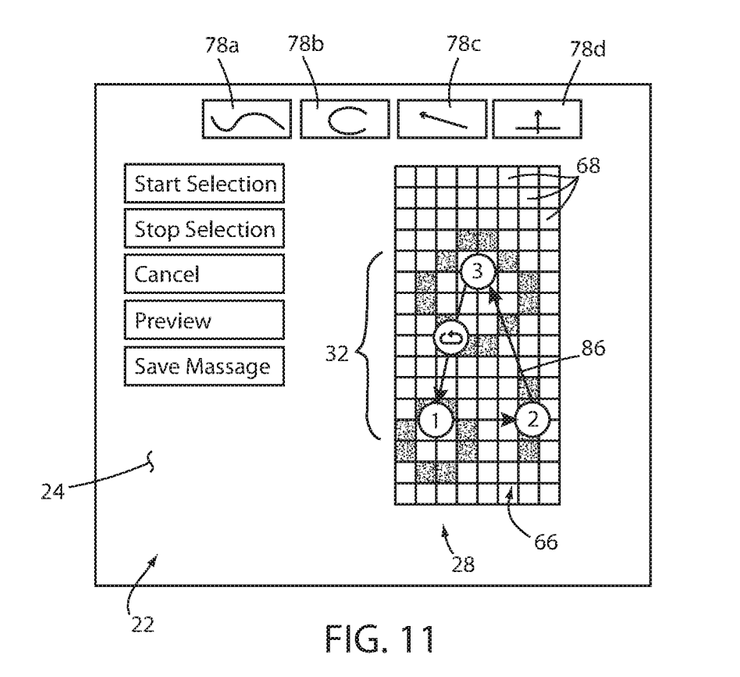

As shown in FIG. 9, an alternative process for adjusting the size of the desired massage element 80 (FIG. 8) is shown, in which the user can use an outwardly extending pinch motion of multiple taps and releases 82 to increase the size of the particular element 80 to be added to the massage sequence 32 (FIG. 3). In a similar manner an inward motion can decrease the size of the desired element 80. In this manner, the user can add a desired number of preselected elements 80 of varying types and/or sizes to image 28 for implementation and overall massage sequence 32 executed by controller 26 (FIG. 1B) using massage assemblies 16 (FIG. 1). As shown in FIGS. 10 and 11, when multiple elements 80 are pre-placed (such as by having been added, as described above), processor 25 can allow the user to select and/or change an order in which set preselected elements 80 are implemented in the overall massage sequence 32. As shown, the user can execute a moving touch input 70 in the particular direction 76 to indicate a line 72 through the various placed massage elements 80. Processor 25 can interpret the order in which the preselected elements 80 are intersected or otherwise contacted by line 72 to represent a desired order of the preselected elements 80 within massage sequence 32. In a similar manner when line 72 intersects the first element 80, as indicated in FIGS. 10 and 11, processor 25 can interpret that as an indication that the user desires for controller 26 to repeat the sequence 32 until directed by a user otherwise. In an alternative embodiment processor 25 can interpret the order in which elements 80 are added as a desired order and/or can provide an additional sequence by which elements 80 can be manually reordered. Similarly, processor 25 can facilitate the ordering of a combination of preselected elements 80 and user drawn line-based massage elements, placed in a similar manner to that which is described above with respect to FIGS. 4-6, in combination on image 28. Further, such a combination of various line-based massage elements or predetermined massage elements 80 can be ordered in a similar manner to that which is described in FIGS. 10 and 11, including by the order in which they are intersected by a line 72 drawn by a user.

It is noted that a single matrix image 28 is shown in FIGS. 4-11, which can be used to illustrate the various bladders 20 located in a specific area of seat 12, including an area, such as within seatback 38 that is actually acted on by multiple massage assemblies 16a and 16b. In a further embodiment, various images 28 can be presented in a manner that correspond to the individual massage assemblies 16, including on the respective sides of seatback 38, as well as massage assembly 16b within cushion 40. Such various images 28 can be presented alongside one another in a two-dimensional arrangement, thereby allowing the user to develop a massage sequence 32 that extends over the various matrices 18 in a single action.

It is noted that in the representation of vehicle seat 12 shown in FIG. 1, matrices 18 occupy only a central area of seatback 38 extending through the lumbar 56 and thoracic 58 areas of seatback 38, while separate bladders 20 are shown within seatback bolsters 60, matrices 18 can extend throughout the width of seatback 38, including seatback bolsters 60. In a similar manner one or more matrices 18c, can extend through cushion central area 62 as well as cushion bolsters 64.

Figure 12:
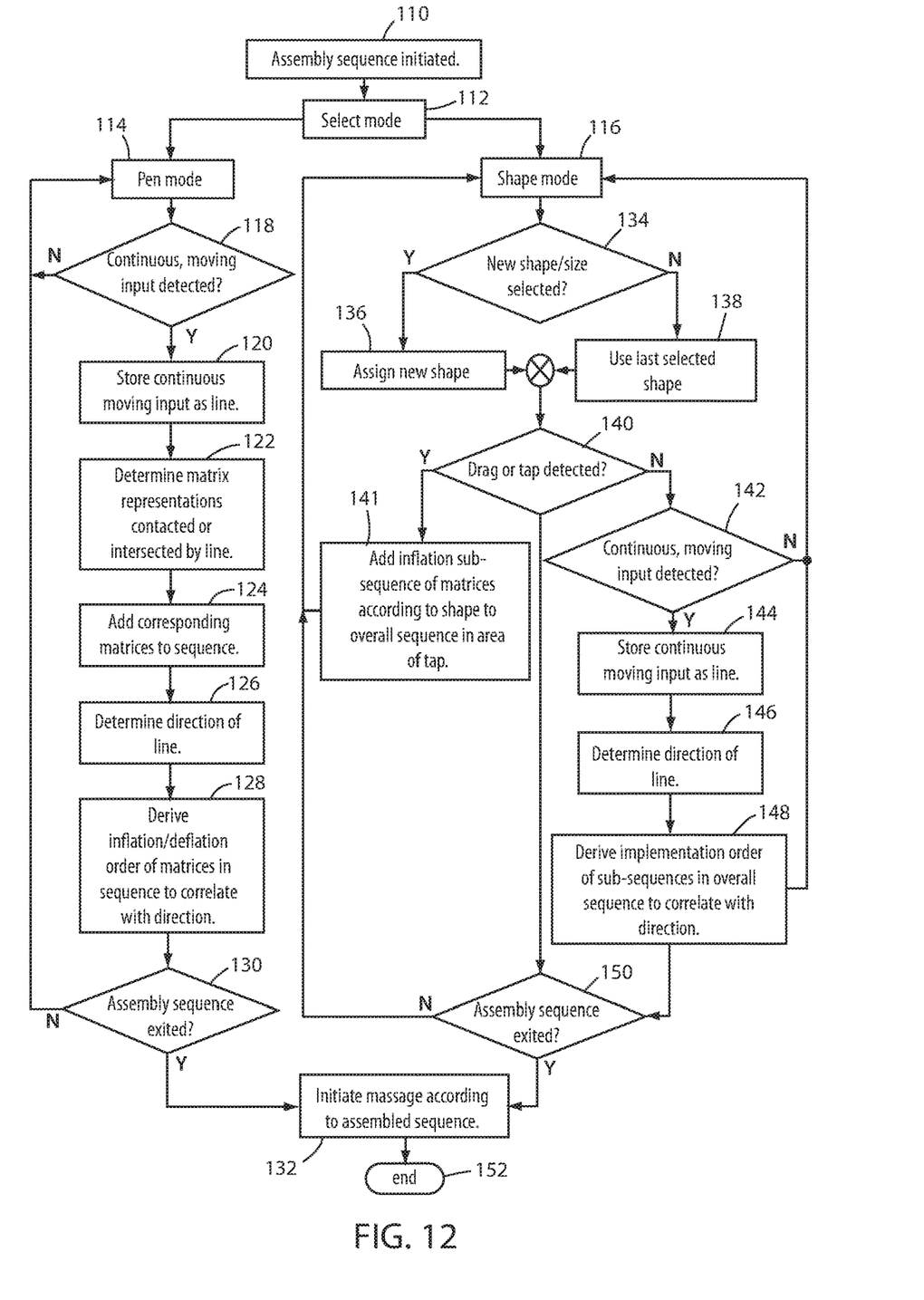
FIG. 12 is a flowchart showing logic used in facilitating user assembly of a custom massage according to one or more of the embodiments described.

Turning now to FIG. 12 a method by which processor 25 and controller 26 (FIG. 1B) can implement a user-selected massage, including using system 10 (FIG. 2) as described herein, is illustrated. In particular, in step 110, the user, such as by way of HMI 36 (FIG. 2) or another touchscreen 24 (FIG. 1B) and/or interface 22, including smartphone 88 (FIG. 1B) with a processor 25 electronically, including wirelessly, connected with controller 26. Subsequently, in an embodiment where both "pen" type selection and shape placement selection are available, the interface 22 can allow the user to select between the two modes in step 112, at which point processor 25 enters either the pen mode in step 114 or the shape mode in step 116. In the pen mode 114, the processor 25 waits for detection of a continuous moving input 70, indicating the drawing of a line 72 in step 118. When such an input 70 is detected, the input 70 is interpreted and stored as a line 72 (FIG. 5) in step 120. The processor 25 then determines the bladder images 68 that are contacted by or intersected by the line 72 stored in step 120 (step 122). In step 124 the bladder 20 (FIG. 1B) corresponding with the intersected bladder images 68 are added to a stored massage sequence 32. Subsequently in step 126 the direction 76 of the line 72 is interpreted and correlated with an order of inflation for the selected ones of bladders 20, such order being stored in memory in step 128. Subsequently, the processor 25 waits for further continuous moving inputs 70 in step 118, and adds further line-based elements to the massage sequence 32 by repeating steps 120-128 for further continuous moving inputs 70 until the assembly sequence is exited in step 130, at which point controller 26 implements the massage sequence 32 by activation of pump 50 (FIG. 1B) and inflation and deflation of the appropriate ones of bladders 20 using manifold units 48 (FIG. 1B) to control the inflation and deflation of the desired bladders 20 in the order dictated by the assembled massage sequence 32 (step 132).

Alternatively, when shape mode 116 is entered, processor 25 in step 134 waits for selection of a new size or shape. If a new shape is selected in step 136, that shape is assigned as the selected shape in memory. Alternatively, if a drag or tap is detected by processor 25 on touchscreen 24 (FIG. 1B) without selection of a new shape, the last shape in memory (step 138) is used as the designated shape. Subsequently, if a drag or tap is detected in step 140, the designated shape is added to the overall sequence 32 (FIG. 3) in the area of touchscreen 24 corresponding with the matrix image 28 (step 141). At this point, processor 25 awaits further input in step 116. Upon detecting further drags or taps in step 138, the last or new shape is further placed in the appropriate area of matrix image 28 and the corresponding bladders 20 of the appropriate massage assemblies 16 are added to the sequence.

As shown in step 142, when a continuous moving input 70 is detected during shape mode 116 the input 70 is stored as a line 72 in step 144, processor 25 determines the direction 76 of the line 72 in step 146. Processor 25 then assigns an order of implementation, as described in FIGS. 10 and 11, of the subsequences of bladder 20 inflation and deflation corresponding with the shapes defined by the preselected elements 80 (FIG. 8) to correlate with the direction of the line 72 determined in step 146 (step 148) when the assembly sequence is initiated in step 150 controller 26 then executes the massage sequence 32 according to the assembly thereof. After either a predetermined lapse of time or a user selection, controller 26 ends the massage in step 152.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A massage system, comprising: a seat having a first surface;
a first massage assembly beneath the first surface and including a first matrix of inflatable bladders;
an interface including a touchscreen displaying an image of the first matrix on the touchscreen and receiving a touch input;
a processor interpreting the touch input as an indication of a desired massage sequence; and
a controller causing the first massage assembly to implement the desired massage sequence,
wherein the touch input is in the form of a continuous, moving touch over an area of the touchscreen on which the image of the first matrix is displayed; and
the processor interprets the touch input as the indication of the desired massage sequence by defining the continuous moving touch as a line over the image of the first matrix and including ones of the bladders contacted or intersected by the line in the massage sequence;
wherein the processor further interprets the touch input as the indication of the desired massage sequence by matching sequence of inflation and deflation of the ones of the bladders included in the massage sequence with a direction of movement of the continuous, moving touch input.

2. The system of claim 1, wherein the first matrix includes an array of adjacent, individually-inflatable and deflatable bladders, the array including at least four bladders in a first direction and at least eight bladders in a second direction.

3. The system of claim 1, wherein: the touch input further comprises one of a tap or release within an area of the image of the touchscreen on which the image of the first matrix is presented; and the processor interprets the touch input as the indication of the desired massage sequence by including in the sequence a preselected massage element in a location of the tap or release.

4. The system of claim 3, wherein:
the preselected massage element is selected by a user on the touchscreen and includes at least one of a circular shape, a linear shape, a stretching shape, and a rolling shape.

5. The system of claim 1, wherein:
the processor includes pre-placed massage shape elements contacted or intersected by the line in the massage sequence.

6. The system of claim 5, wherein the processor further interprets the touch input as the indication of the desired massage sequence by matching sequence implementation of the pre-placed massage elements included in the massage sequence with a direction of movement of the continuous, moving touch input.

7. The system of claim 1, wherein:
the seat includes a cushion and a seatback coupled with the cushion; and
the first surface is included on the seatback.

8. The system of claim 7, further including a second massage assembly including a second matrix of inflatable bladders, wherein:
the seat has a second surface included on the cushion; and
the second massage assembly is positioned beneath the second surface.

9. The system of claim 1, wherein:
the seat is in a vehicle; and
the touchscreen is included within a functionality set of a human-machine interface within the vehicle.

10. A vehicle, comprising: a seat including:
a first surface; and
a first massage assembly beneath the first surface and including a first matrix of inflatable bladders;
an interface including a touchscreen displaying an image of the first matrix on the touchscreen and receiving a touch input;
a processor interpreting the touch input as an indication of a desired massage sequence; and a massage controller causing the first massage assembly to implement the desired massage sequence,
wherein the touch input is in the form of a continuous, moving touch over an area of the touchscreen on which the image of the first matrix is displayed; and
the processor interprets the touch input as the indication of the desired massage sequence by defining the continuous moving touch as a line over the image of the first matrix and including ones of the bladders contacted or intersected by the line in the massage sequence;
wherein the processor further interprets the touch input as the indication of the desired massage sequence by matching sequence of inflation and deflation of the ones of the bladders included in the massage sequence with a direction of movement of the continuous, moving touch input.

11. The system of claim 10, wherein:
the touch input further comprises one of a tap or release within an area of the image of the touchscreen on which the image of the first matrix is presented; and
the processor interprets the touch input as the indication of the desired massage sequence by including in the sequence a preselected massage shape in a location of the tap or release.

12. The system of claim 10, wherein:
the processor includes pre-placed massage shape elements contacted or intersected by the line in the massage sequence and matches sequence implementation of the pre-placed massage elements included in the massage sequence with a direction of movement of the continuous, moving touch input.

13. A method for implementing an automated massage, comprising: displaying an image of a matrix on a touchscreen;
receiving a touch input from the touchscreen;
interpreting the touch input with a processor as an indication of a desired massage sequence; and causing a first massage assembly including a first matrix of inflatable bladders that corresponds to the matrix image to implement the desired massage sequence by selective inflation and deflation of ones of the bladders,
wherein: the automated massage is implemented in a seat in a vehicle having a first surface; the first massage assembly is positioned beneath the first surface; and the touchscreen is included in a human-machine interface within the vehicle,
the touch input is in the form of a continuous, moving touch over an area of the touchscreen on which the image of the matrix is displayed; and
wherein interpreting the touch input as the indication of the desired massage sequence includes defining the continuous moving touch as a line over the image of the matrix and including ones of the bladders contacted or intersected by the line in the massage sequence;

wherein the processor further interprets the touch input as the indication of the desired massage sequence by matching sequence of inflation and deflation of the ones of the bladders included in the massage sequence with a direction of movement of the continuous, moving touch input.

14. The method of claim 13, wherein:

the touch input is further in the form of one of a tap or release within an area of the image of the touchscreen on which the image of the matrix is presented; and interpreting the touch input as the indication of the desired massage sequence includes including in the sequence a preselected massage shape in a location of the tap or release.

* * * * *